United States Patent
Tanaka et al.

(10) Patent No.: US 7,599,782 B2
(45) Date of Patent: Oct. 6, 2009

(54) VARIABLE VALVE TIMING CONTROLLER FOR INTERNAL COMBUSTION ENGINE

(75) Inventors: Toshikazu Tanaka, Kariya (JP); Masaomi Inoue, Kariya (JP); Yuuichi Takemura, Anjo (JP); Zenichiro Mashiki, Nissin (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 225 days.

(21) Appl. No.: 11/896,118

(22) Filed: Aug. 29, 2007

(65) Prior Publication Data

US 2008/0065307 A1     Mar. 13, 2008

(30) Foreign Application Priority Data

Aug. 30, 2006   (JP) .............................. 2006-233284

(51) Int. Cl.
   *G06F 19/00* (2006.01)
   *F01L 1/34* (2006.01)
   *F01L 9/04* (2006.01)

(52) U.S. Cl. .................. 701/103; 123/90.17; 123/90.31

(58) Field of Classification Search .............. 123/90.11, 123/90.15–90.18, 90.31, 347, 348; 701/101–103, 701/110, 113–115; 361/152, 154; 318/142, 318/144, 268, 767
See application file for complete search history.

(56) References Cited

U.S. PATENT DOCUMENTS

| | | | | |
|---|---|---|---|---|
| 2,237,015 A | * | 4/1941 | Stratton | ...................... 318/142 |
| 7,107,951 B2 | * | 9/2006 | Urushihata et al. | ........ 123/90.17 |
| 7,363,896 B2 | * | 4/2008 | Urushihata et al. | ........ 123/90.17 |
| 7,412,323 B2 | * | 8/2008 | Tanaka et al. | ............. 123/90.17 |
| 2006/0042579 A1 | | 3/2006 | Izumi et al. | |
| 2006/0174849 A1 | * | 8/2006 | Okamoto | .................. 123/90.16 |
| 2007/0221150 A1 | * | 9/2007 | Inoue et al. | ............... 123/90.17 |
| 2008/0066700 A1 | * | 3/2008 | Mashiki et al. | ........... 123/90.11 |
| 2008/0071463 A1 | * | 3/2008 | Tanaka et al. | ................ 701/102 |
| 2008/0081702 A1 | * | 4/2008 | Tanaka et al. | ............. 123/90.17 |
| 2008/0257292 A1 | * | 10/2008 | Inoue | ....................... 123/90.17 |
| 2009/0055085 A1 | * | 2/2009 | Inoue et al. | ............... 123/90.15 |
| 2009/0071425 A1 | * | 3/2009 | Inoue et al. | ............... 123/90.15 |
| 2009/0101094 A1 | * | 4/2009 | Mashiki et al. | ........... 123/90.17 |

* cited by examiner

*Primary Examiner*—Willis R Wolfe, Jr.
(74) *Attorney, Agent, or Firm*—Nixon & Vanderhye, PC

(57) ABSTRACT

An ECU outputs a signal indicative of a target motor speed calculated based on a deviation between a target camshaft phase and an actual camshaft phase to an EDU. The EDU performs a feedback control of the output current (motor current) of the EDU so that the deviation is decreased, whereby an actual camshaft phase is feedbacked to a target camshaft phase. When the supply voltage of EDU is less than the operation limit voltage established higher than minimum operation assurance voltage, the variation of the target motor speed is restricted. Thereby, the output current of EDU is restricted, and further, when the supply voltage is less than minimum operation assurance voltage, the output current of EDU is intercepted.

6 Claims, 6 Drawing Sheets

VARIABLE VALVE TIMING CONTROLLER FOR INTERNAL COMBUSTION ENGINE

CROSS-REFERENCE TO RELATED APPLICATION

This application is based on Japanese Patent Application No. 2006-233284 filed on Aug. 30, 2006, the disclosure of which is incorporated herein by reference.

FIELD OF THE INVENTION

The present invention relates to a variable valve timing controller which includes an electric motor as a driving source. A rotation speed of the electric motor is varied to adjust a rotational phase of the camshaft relative to a crankshaft, whereby a valve timing of an intake valve and/or an exhaust valve is adjusted.

BACKGROUND OF THE INVENTION

In order to, perform electronic control of the variable valve timing control, the variable valve timing controller which has the motor as a source of the drive has been developed. The variable valve timing controller described in JP-2006-70754A (US2006/0042578A1) includes a first gear, a second gear, a phase changing gear, and an electric motor. The first gear (outer gear) is concentrically arranged with the camshaft and is rotated with the rotation driving force of the crankshaft. The second gear (inner gear) rotates together with the camshaft. The phase changing gear (planet gear) transmits the torque of the first gear to the second gear, and varies the rotational phase of the second gear relative to the first gear. The motor is coaxially provided to the camshaft so that the revolution speed of the phase changing gear is controlled. The number of teeth of the first gear, the second gear, and the phase changing gear is determined so that the camshaft may rotate with one half of the rotational speed of the rotational speed of the crankshaft. And when not varying valve timing, the rotational speed of the motor is coincided with the rotational speed of the camshaft, and the revolution speed of the phase changing gear is coincided with the rotational speed of the camshaft. When varying valve timing, the motor speed is varied relative to the rotational speed of the camshaft, and the revolution speed of the phase changing gear is varied relative to the rotational speed of the camshaft. Thereby the difference between the rotational phase of the first gear and the second gear is varied.

When controlling the motor, a control signal indicative of a target motor speed is outputted to a motor driving circuit from an engine control unit. A duty ratio of switching element, such as a power MOSFET, is adjusted to control an output current to the motor from the motor driving circuit. The motor driving circuit receives supply voltage from a battery. There are some cases in which the supply voltage is decreased due to a shortage of charging or an increase of power consumption of in-vehicle equipments. In a case that the supply voltage is decreased to a minimum operation assurance voltage for a long period, there is a possibility that the switching elements generate heat to cause a malfunction thereof.

SUMMARY OF THE INVENTION

The present invention is made in view of the above matters, and it is an object of the present invention to provide a variable valve timing controller which can prevent beforehand failure of the switching element of the motor drive circuit due to source voltage lowering.

According to the present invention, a variable valve timing controller adjusts a valve timing of an intake valve and/or an exhaust valve by varying a speed of an electric motor relative to a rotational speed of a camshaft in such a manner as to vary a rotational phase of the camshaft relative to a crankshaft of an internal combustion engine. The variable valve timing controller includes a target motor speed calculating means for calculating a target motor speed based on a rotating speed of the internal combustion engine and a deviation between a target camshaft phase and an actual camshaft phase. The variable valve timing controller includes a motor drive circuit which controls the driving current of the motor to decrease the deviation between the target motor speed and the actual motor speed. The controller further includes a voltage detecting means for detecting a supply voltage supplied to the motor drive circuit, and a motor current limit means for restricting an output current of the motor drive circuit when the supply voltage detected by the voltage detecting means is less than an operation limit voltage established higher than a minimum operation assurance voltage of the motor drive circuit.

With this, when the supply voltage falls to near the minimum operation assurance voltage of the motor drive circuit, the output current (motor current) of the motor drive circuit is restricted, and the ON period of the switching element of the motor drive circuit becomes short. Thereby, the heat generation and increase in temperature of the switching element due to source voltage lowering can be restrained, and failure of the switching element can be prevented beforehand. In this case, when the output current (motor current) of the motor drive circuit is restricted, the valve timing control is performed with a slow response.

DETAILED DESCRIPTION OF THE PREFERRED EMBODIMENTS

Figure 1:
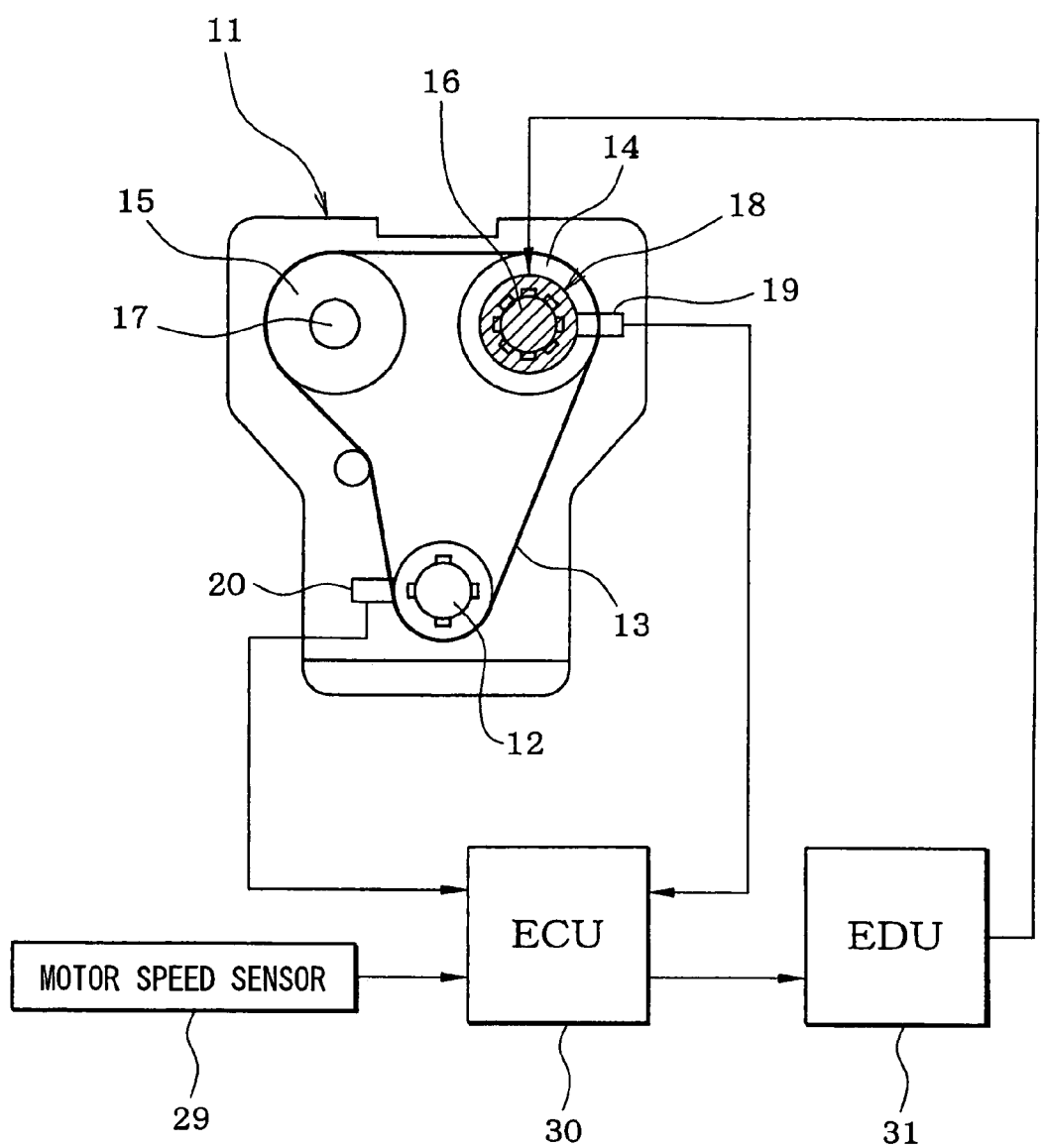
FIG. 1 is a schematic view showing an engine control system according to an embodiment of the present invention.

An embodiment of the present invention will be described hereinafter. FIG. 1 schematically shows a whole structure of an engine control system. An internal combustion engine 11, which is referred to as an engine hereinafter, includes a crankshaft 12. A driving force of the crankshaft 12 is transmitted to an intake camshaft 16 and an exhaust camshaft 17 through a timing chain 13 (or a timing belt) and sprockets 14, 15. A variable valve timing controller 18, which includes an electric motor, is coupled to the intake cam shaft 16. The variable valve timing controller 18 varies a rotational phase (camshaft phase) of the intake camshaft 16 relative to the crankshaft 12 so that the valve timing of an intake valve (not shown) is adjusted.

A cam angle sensor 19 is provided around the intake camshaft 16. The cam angle sensor 19 outputs a cam angle signal every predetermined cam angle of the intake camshaft 16. A crank angle sensor 20 is provided around the cranks shaft 12. The crank angle sensor 20 outputs a crank angle signal every predetermined crank angle.

Figure 2:
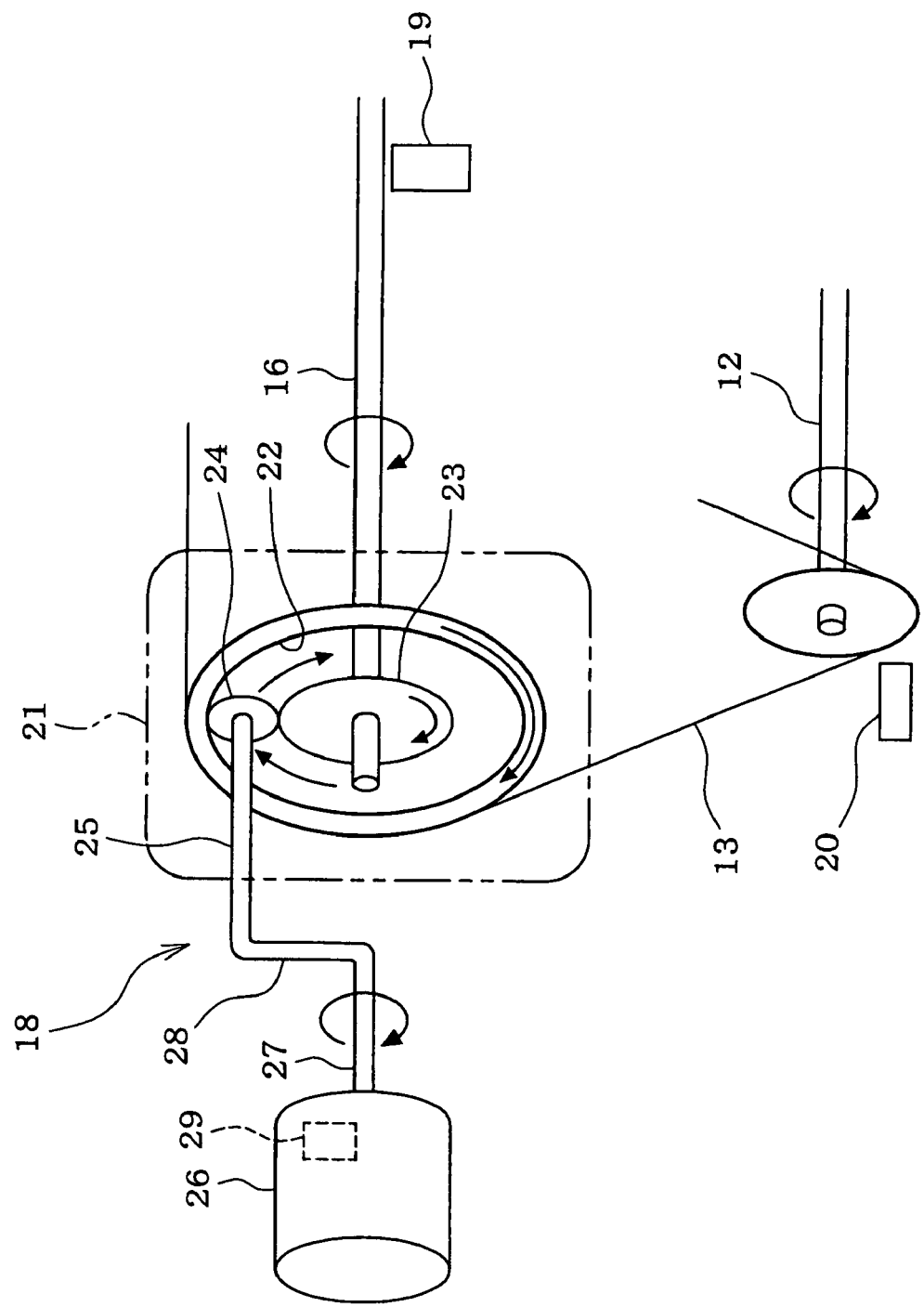
FIG. 2 is a schematic view showing a variable valve timing controller.

Referring to FIG. 2, a structure of the variable valve timing controller 18 is described. The variable valve timing controller 18 includes a phase control mechanism 21. The phase control mechanism 21 includes an outer gear 22 (a first gear), an inner gear 23 (a second gear), and a planet gear 24 (a phase changing gear). The outer gear 22 is concentrically arranged with the intake camshaft 16 and has inner teeth. The inner gear 23 is concentrically arranged with the outer gear 22 and has outer teeth. The planet gear 24 is arranged between the outer gear 22 and the inner gear 23 to be engaged with both gears 22, 23. The outer gear 22 rotates integrally with the sprocket 14 which rotates in synchronization with the crankshaft 12, and the inner gear 23 rotates integrally with the intake camshaft 16. Engaging with the outer gear 22 and the inner gear 23, the planet gear 24 rotates around the inner gear 23 to transfer a rotation force from the outer gear 22 to the inner gear 23. A rotational phase of the inner gear 23 (camshaft phase) relative to the outer gar 22 is adjusted by varying a revolution speed of the planet gear 24 relative to the rotation speed of the inner gear 23. The number of teeth of the outer gear 22, the inner gear 23 and the planet gear 24 are determined in such a manner that the intake camshaft 16 rotates in a half speed of the crankshaft 12.

(Rotation speed of the intake camshaft)=(Rotation speed of the crankshaft)×½

The engine 11 is provided with a motor 26 which varies the revolution speed of the planet gear 24. A rotation shaft 27 of the motor 26 is concentrically arranged with the intake camshaft 16, the outer gear 22, and the inner gear 23. A connecting shaft 28 connects the rotation shaft 27 with a supporting shaft 25 of the planet gear 24. When the motor 26 is energized, the planet gear 24 rotates on the supporting shaft 25 and orbits around the inner gear 23. Besides, the motor 26 is provided with a motor speed sensor 29 which outputs a rotational motor speed signal.

When the motor 26 is not energized, the rotation shaft 27 rotates in synchronization with the intake camshaft 16. That is, when the rotation speed RM of the motor 26 is consistent with the rotation speed RC of the intake camshaft 16, and the revolution speed of the planet gear 24 is consistent with the rotational speed of the inner gear 23, a difference between a rotational phase of the outer gear 22 and a rotational phase of the inner gear 23 is maintained as a current difference to maintain the valve timing (camshaft phase) as the current valve timing.

When the rotation speed RM of the motor 26 is made higher than the rotation speed RC of the intake camshaft 16, that is, when the revolution speed of the planet gear 24 is made higher than the rotational speed of the inner gear 23, the rotational phase of the inner gear 23 relative to the outer gear 22 is advanced so that the valve timing of the intake valve is advanced.

When the rotation speed RM of the motor 26 is made lower than the rotation speed RC of the intake camshaft 16, that is, when the revolution speed of the planet gear 24 is made lower than the rotational speed of the inner gear 23, the rotational phase of the inner gear 23 relative to the outer gear 22 is retarded so that the valve timing of the intake valve is retarded.

Figure 3:
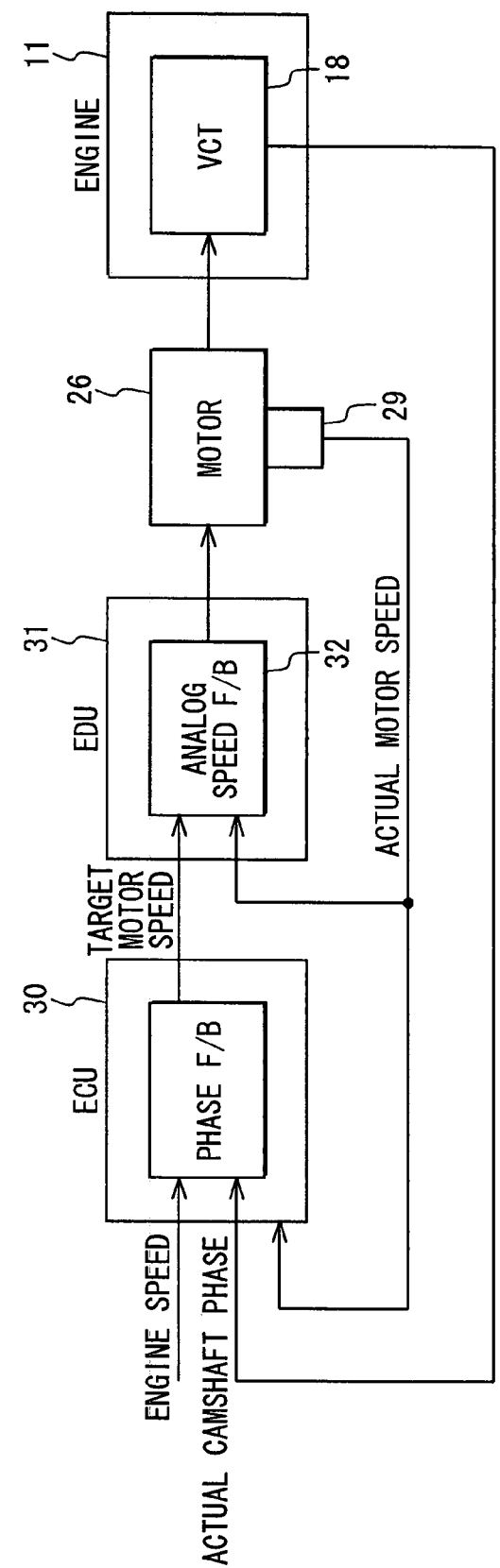
FIG. 3 is a block diagram showing the structure of the control system of the variable valve timing controller.

The outputs of the sensors are inputted into an electronic control unit 30, which is referred to as an ECU 30 hereinafter. The ECU 30 includes a microcomputer which executes engine control programs stored in a ROM (read only memory) to control a fuel injection and an ignition timing according to an engine driving condition. The ECU 30 includes a supply voltage detecting circuit which detects a battery voltage Moreover, the ECU 30 calculates a rotational phase (actual camshaft phase) of the camshaft 16 relative to the crankshaft 12 based on the outputs of the cam angle sensor 19 and the crank angle sensor 20. The ECU 30 calculates the target camshaft phase (target valve timing) according to an engine operating conditions. The ECU 30 calculates the target motor speed based on the engine speed and a deviation between the target camshaft phase and the actual camshaft phase. And as shown in FIG. 3, the ECU 30 outputs the signal indicative of the target motor speed toward the motor drive circuit (EDU) 31.

The EDU 31 has an analog rotating-speed feedback circuit 32 which performs feedback control of the duty of the voltage applied to the motor 26 so that the deviation of the target motor speed and an actual motor speed is decreased. The EDU 31 performs a feedback control of the actual motor speed to the target motor speed, and performs a feedback control of the actual camshaft phase to the target camshaft phase. "Feedback" is expressed as "F/B" in the following description.

Figure 4:
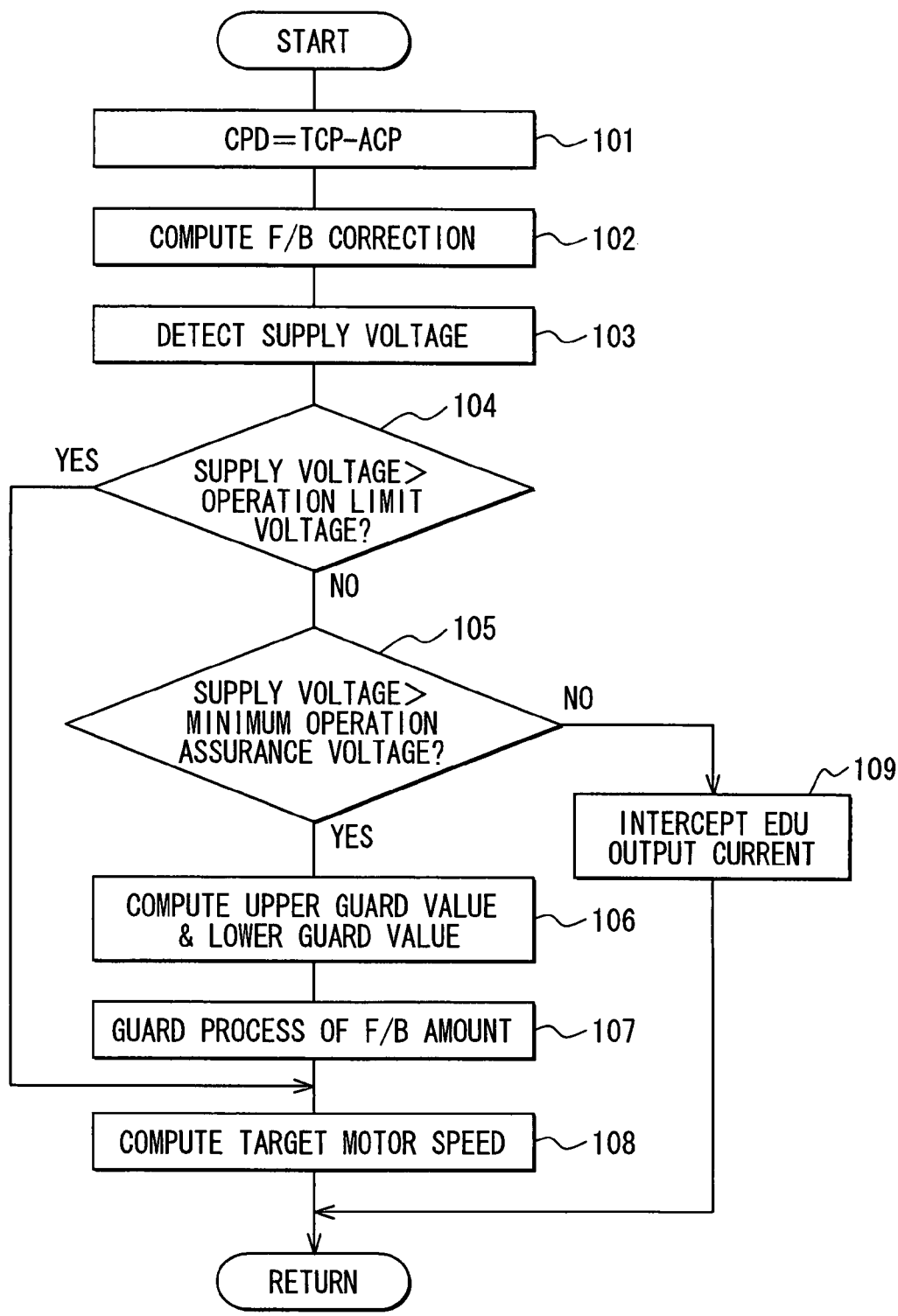
FIG. 4 is a flow chart showing a processing of the target motor speed operation program.

Moreover, the ECU 30 executes the target motor speed operation program shown in FIG. 4 during the engine operation. When the supply voltage (battery voltage) of EDU 31 is less than the operation limit voltage established higher than a minimum operation assurance voltage of EDU 31, the variation in the target motor speed (rotational speed F/B correction amount) outputted to EDU 31 is restricted. Furthermore, when the supply voltage of EDU 31 is less than the minimum operation assurance voltage of EDU 31, the energization OFF signal is outputted to EDU 31 and the output current (motor current) of EDU 31 is intercepted. Referring to FIG. 4, a processing of the target motor speed operation program is described hereinafter.

The target motor speed operation program is executed every predetermined cycle during the engine operation. In step 101, a deviation between the target camshaft phase and the actual camshaft phase is computed. This deviation is referred to as the camshaft phase deviation.

Camshaft phase deviation (*CPD*)=Target camshaft phase (*TCP*)−Actual camshaft phase (*ACP*)

Figure 5:
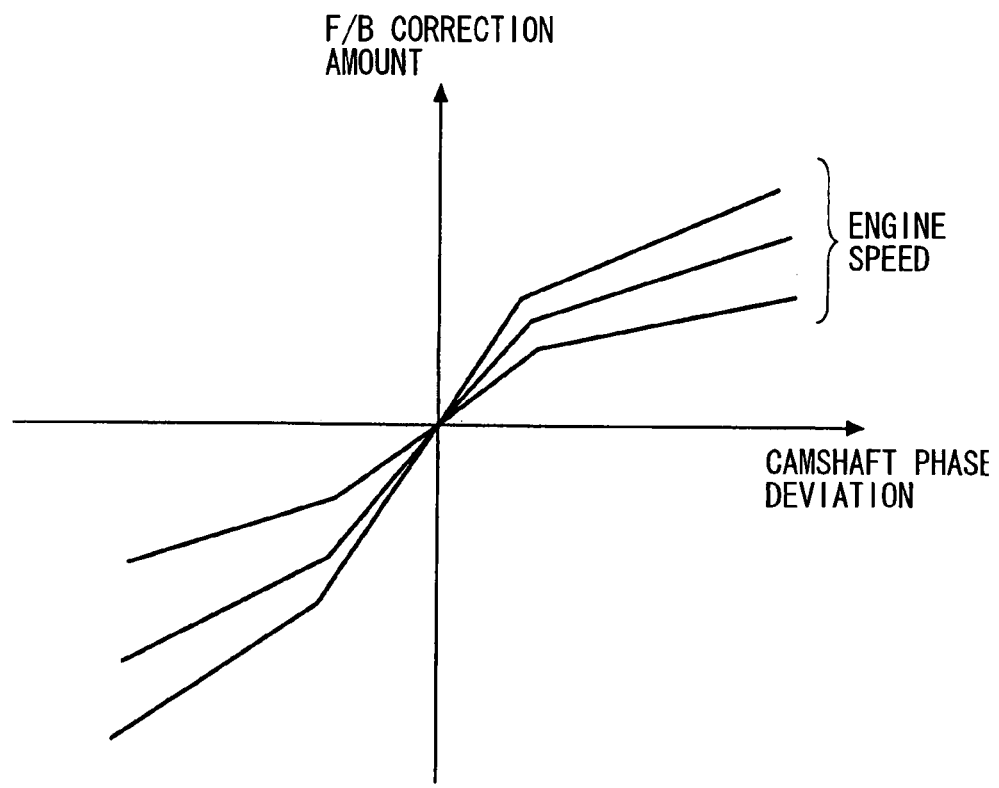
FIG. 5 is a graph schematically showing the rotational speed F/B correction quantity map.

Then, the procedure proceeds to step 102 in which the rotational speed F/B correction amount according to the present engine speed and the camshaft phase deviation is computed with reference to the rotational speed F/B correction amount map shown in FIG. 5. In the rotational speed F/B correction amount map, as camshaft phase deviation (CPD) increases, the rotational speed F/B correction amount increases. Moreover, as the engine speed increases, the rotational speed F/B correction amount increases.

The procedure proceeds to step 103 after computing the rotational speed F/B correction amount. After detecting the supply voltage (battery voltage) of EDU 31, the procedure proceeds to step 104 in which it is determined whether the supply voltage of EDU 31 is higher than the operation limit voltage. Here, the operation limit voltage is determined for establishing the maximum of the voltage region where the heat value of the switching elements, such as power MOSFET of EDU 31, increases due to lowering of the supply voltage. The operation limit voltage is set higher than the minimum operation assurance voltage of EDU 31 by a predetermined voltage.

In step 104, when it determines that the supply voltage of EDU 31 is higher than the operation limit voltage, it is not necessary to restrict the output current of EDU 31. The procedure proceeds to step 108 in which the target motor speed is established based on the following equation without restricting the rotational speed F/B correction amount.

Target motor speed (*TMS*)=Base target motor speed (*BTMS*)+Rotational speed *F/B* correction amount (*RSFBC*)

Here, the base target motor speed is the motor speed which is in agreement with the camshaft rotational speed (crankshaft rotation speed×½).

On the other hand, when it is determined that the supply voltage of EDU 31 is not more than the operation limit voltage in step 104, the procedure proceeds to step 105. In step 105, it is determined whether the supply voltage of EDU 31 is higher than a minimum operation assurance voltage (operation limit voltage≧supply voltage>minimum operation assurance voltage). When the answer is Yes in step 105, the procedure proceeds to step 106. That is, it is necessary to restrict the heat generation of the switching elements. In step 106, an upper guard value and a lower guard value with respect to the rotational speed F/B correction amount are computed in accordance with the engine speed based on a guard map shown in FIG. 6.

Figure 6:
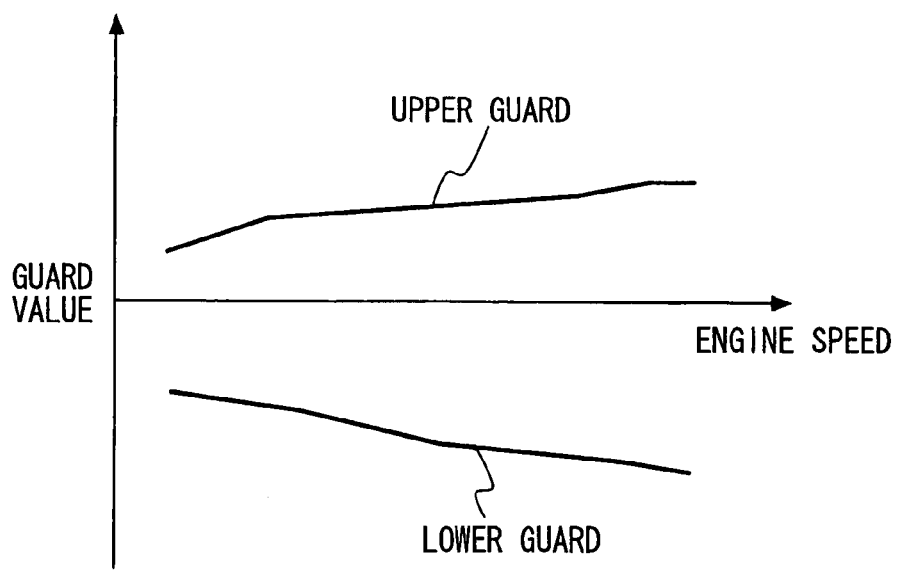
FIG. 6 is a graph schematically showing an upper and a lower guard value map.

In the guard map shown in FIG. 6, as the engine speed increases, the absolute values of the upper guard value and the lower guard value increase. Besides, the upper and lower guard values may be established according to the engine speed and the camshaft phase deviation. For simplification of operation processing, the guard values may be established as predetermined constant values.

Then, the procedure proceeds to step 107 in which the rotational speed F/B correction amount is guard-processed with the upper and lower guard values which are computed in step 106. That is, in a case that the rotational speed F/B correction amount is greater than the upper guard value, the rotational speed F/B correction amount is brought to the upper guard value. In a case that the rotational speed F/B correction amount is less than the lower guard value, the rotational speed F/B correction amount is brought to the lower guard value. In a case that the rotational speed F/B correction amount is within a range between the upper guard value and the lower guard value, the rotational speed F/B correction amount is not changed. In steps 105, 106 and 107, electric current applied to the motor is restricted.

Then, the procedure proceeds to step 108 in which the target motor speed is computed by using of the guarded processed rotational speed F/B correction amount.

Target motor speed (*TMS*)=Base target motor speed (*BTMS*)+Guard-processed Rotational speed *F/B* correction amount (*G-RSFBC*)

The ECU 30 outputs the signal indicative of the target motor speed calculated by the above process toward the EDU 31.

Meanwhile, in step 105, when it is determined that the supply voltage of EDU 31 is not more than the minimum operation assurance voltage, it is determined that the heat generation limit of the switching element of the EDU 31 is exceeded, so that the procedure proceeds to step 109. The energization OFF signal is outputted to EDU 31 from ECU 30, the switching element of EDU 31 is turned off compulsorily, and the output current (motor current) of EDU 31 is intercepted. In steps 105 and 109, the motor current is intercepted.

A control process of the present embodiment will be described hereinafter based on a time chart shown in FIG. 7.

Figure 7:
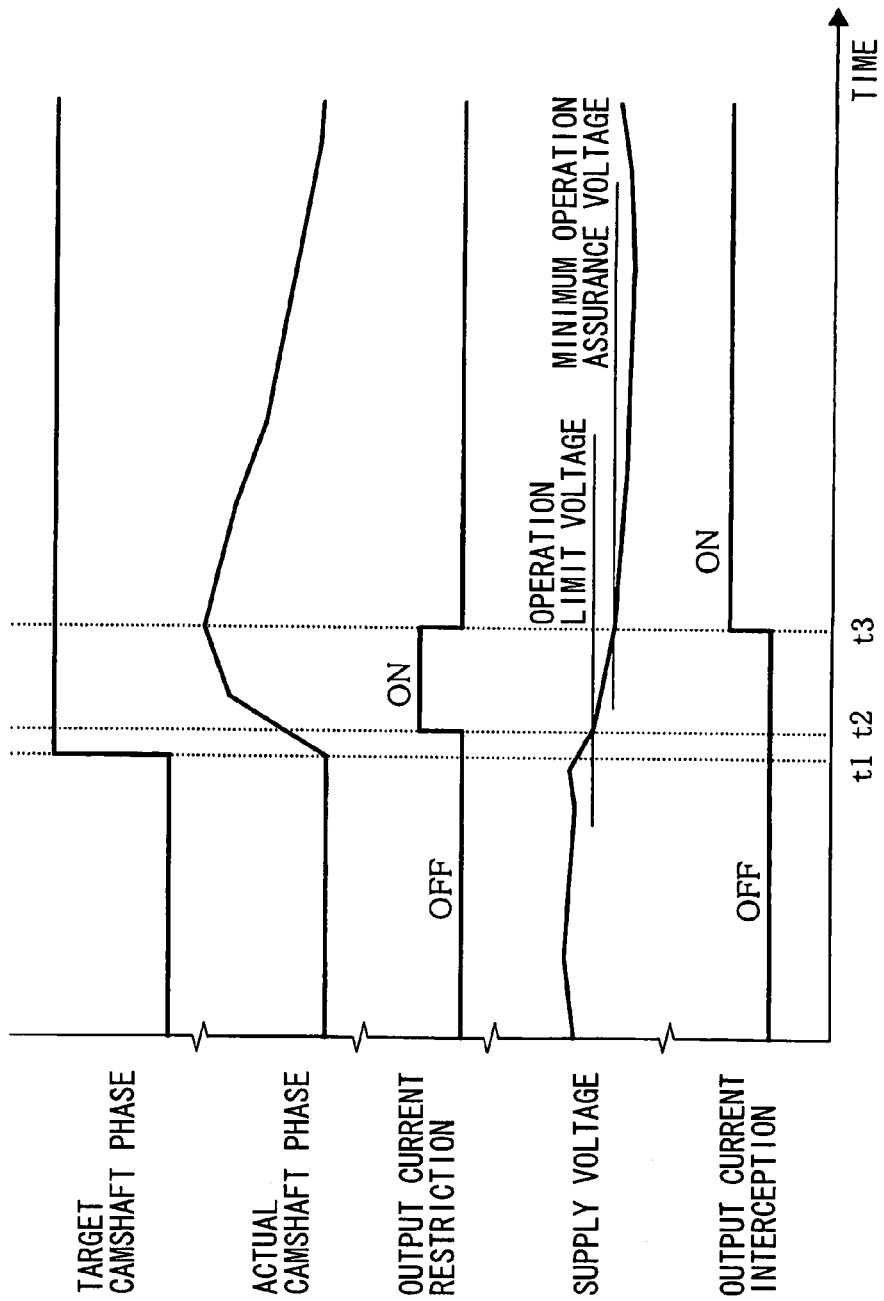
FIG. 7 is a time chart for explaining a control process.

In FIG. 7, at time t1, the target camshaft phase stepwise changes, and the actual camshaft phase begins to change in such a manner as to follow it. Then, an output current restriction processing is started at time t2 in which the supply voltage of EDU 31 is brought to be less than the operation limit voltage. During the output current restriction processing, the variation (rotational speed F/B correction amount) in the target motor speed which is outputted to the EDU 31 from the ECU 30 is restricted, whereby the output current (motor current) of the EDU 31 is restricted.

In the present embodiment, the supply voltage of EDU 31 falls also during execution of output current restriction processing. At a time t3 in which the supply voltage is brought to be less than the minimum operation assurance voltage, the output current restriction processing changes to output current interception processing, and the energization OFF signal is outputted to the EDU 31 from the ECU 30. The switching element of the EDU 31 is turned off compulsorily and the output current (motor current) of the EDU 31 is intercepted.

According to the present embodiment, when the supply voltage of EDU 31 is less than the operation limit voltage established higher than the minimum operation assurance voltage of EDU 31, the variation (rotational speed F/B correction amount) of the target motor speed outputted to EDU 31 from ECU 30 was restricted, and the output current (motor current) of EDU 31 was restricted. Thereby, when the supply voltage of the EDU 31 falls to near minimum operation assurance voltage, the output current (motor current) of EDU 31 is restricted and the ON period of the switching element of EDU 31 becomes short. Hence, the heat generation and temperature rise in the switching element due to source voltage lowering can be restrained, and failure of the switching element can be prevented beforehand. In this case, when the motor current is restricted, the speed of response of the variable valve timing control becomes slow.

Furthermore, in this embodiment, when the supply voltage of EDU 31 is less than minimum operation assurance voltage, the energization OFF signal is outputted to the EDU 31 from the ECU 30, and the output current (motor current) of EDU 31 is intercepted. Thereby, when the supply voltage of EDU 31 is less than minimum operation assurance voltage, the switching element of EDU 31 can be turned off thoroughly, the heat generation and the temperature rise in the switching element can be restrained certainly, and failure of the switching element can be prevented beforehand.

Besides, the present invention is not limited to the variable valve timing controller of the intake valve, but may be applied to the variable valve timing controller of the exhaust valve. Furthermore, the phase variable mechanism of the variable valve timing device 18 is not limited to the planetary gear mechanism. Other mechanisms are employable when the valve timing is changed by varying the rotational speed of the motor relative to the rotational speed of the camshaft.

What is claimed is:

1. A variable valve timing controller adjusting a valve timing of an intake valve and/or an exhaust valve by varying a speed of an electric motor relative to a rotational speed of a camshaft in such a manner as to vary a rotational phase of the camshaft relative to a crankshaft of an internal combustion engine, variable valve timing controller comprising:

a target motor speed calculator which calculates a target motor speed based on a rotating speed of the internal combustion engine and a deviation between a target camshaft phase and an actual camshaft phase;

a motor drive circuit which controls the driving current of the motor to decrease the deviation between the target motor speed and the actual motor speed;

a voltage detector which detects a supply voltage supplied to the motor drive circuit; and a motor current limiter which restricts an output current of the motor drive circuit when the supply voltage detected by the voltage detector is less than an operation limit voltage established higher than a minimum operation assurance voltage of the motor drive circuit.

2. A variable valve timing controller adjusting a valve timing of an intake valve and/or an exhaust valve by varying a speed of an electric motor relative to a rotational speed of a camshaft in such a manner as to vary a rotational phase of the camshaft relative to a crankshaft of an internal combustion engine, variable valve timing controller comprising:

a target motor speed calculating means for calculating a target motor speed based on a rotating speed of the internal combustion engine and a deviation between a target camshaft phase and an actual camshaft phase;

a motor drive circuit which controls the driving current of the motor to decrease the deviation between the target motor speed and the actual motor speed;

a voltage detecting means for detecting a supply voltage supplied to the motor drive circuit; and a motor current limit means for restricting an output current of the motor drive circuit when the supply voltage detected by the voltage detecting means is less than an operation limit voltage established higher than a minimum operation assurance voltage of the motor drive circuit.

3. A variable valve timing controller according to claim 1, further comprising:

a motor current intercept means for intercepting the output current of the motor drive circuit when the supply voltage detected by the voltage detecting means is less than the minimum operation assurance voltage of the motor drive circuit.

4. A variable valve timing controller according to claim 1, wherein the motor current limit means restricts the variation in target motor speed so as to restrict the output current of the motor drive circuit, when the supply voltage detected by the voltage detecting means is less than the operation limit voltage.

5. A variable valve timing controller according to claim 4, wherein the target motor speed calculating means computes a motor speed correction amount based on the rotating speed of the internal combustion engine and the deviation between the target camshaft phase and the actual camshaft phase, and computes the base target motor speed by correcting a base target motor speed according to the rotating speed of the camshaft with the motor speed correction amount, and the motor current limit means restricts the motor speed correction amount so as to restrict the variation in target motor speed, when the supply voltage detected by the voltage detecting means is less than the operation limit voltage.

6. A variable valve timing controller according to claim 5, wherein the motor current limit means varies a restricting area of the motor speed correction amount according to the rotating speed of the internal combustion engine.

* * * * *